United States Patent
Kubouchi (10) Patent No.: US 9,812,966 B2
(45) Date of Patent: Nov. 7, 2017

(54) CHOPPER CIRCUIT

(71) Applicant: FUJI ELECTRIC CO., LTD., Kawasaki-shi, Kanagawa (JP)

(72) Inventor: Motoyoshi Kubouchi, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/440,801

(22) Filed: Feb. 23, 2017

(65) Prior Publication Data

US 2017/0288544 A1    Oct. 5, 2017

(30) Foreign Application Priority Data

Apr. 1, 2016    (JP) .................................. 2016-074278
Dec. 2, 2016    (JP) .................................. 2016-235240

(51) Int. Cl.
*H02M 3/158*    (2006.01)
*H02M 1/32*    (2007.01)
*H02M 1/08*    (2006.01)
*H02M 1/00*    (2006.01)

(52) U.S. Cl.
CPC ............. *H02M 3/158* (2013.01); *H02M 1/08* (2013.01); *H02M 1/32* (2013.01); *H02M 2001/0009* (2013.01)

(58) Field of Classification Search
CPC .......... H02M 3/158; H02M 1/08; H02M 1/32; H02M 2001/0009
See application file for complete search history.

(56) References Cited

U.S. PATENT DOCUMENTS

| | | | | |
|---|---|---|---|---|
| 5,932,995 A | * | 8/1999 | Wagoner | H02M 3/158 323/222 |
| 9,160,232 B2 | * | 10/2015 | Thomas | H02M 7/483 |
| 2006/0238941 A1 | * | 10/2006 | Ingemi | H02J 9/062 361/92 |
| 2014/0070787 A1 | * | 3/2014 | Arno | H02M 3/07 323/304 |
| 2016/0344214 A1 | * | 11/2016 | Petersen | H02J 7/0052 |

FOREIGN PATENT DOCUMENTS

| | | |
|---|---|---|
| JP | H04-200268 A | 7/1992 |
| JP | 2013-038921 A | 2/2013 |

* cited by examiner

*Primary Examiner* — Jue Zhang
(74) *Attorney, Agent, or Firm* — Manabu Kanesaka (57) ABSTRACT

A chopper circuit includes a controller that performs control of turning on a second switching device when a short circuit detector detects a short circuit of a first diode, and performs control of turning on a first switching device when the short circuit detector detects a short circuit of a second diode.

9 Claims, 5 Drawing Sheets

CHOPPER CIRCUIT

CROSS-REFERENCE TO RELATED APPLICATIONS

The priority application numbers JP2016-235240, Chopper Circuit, Dec. 2, 2016, Motoyoshi Kubouchi, JP2016-074278, Step-Down Chopper Circuit, Apr. 1, 2016, Motoyoshi Kubouchi, upon which this patent application is based, are hereby incorporated by reference.

BACKGROUND OF THE INVENTION

Field of the Invention

The present invention relates to a chopper circuit, and more particularly, it relates to a chopper circuit including a first diode and a second diode.

Description of the Background Art

A chopper circuit including a first diode and a second diode is known in general, as disclosed in Japanese Patent Laying-Open Nos. 4-200268 and 2013-038921.

Japanese Patent Laying-Open No. 4-200268 discloses a step-down chopper circuit including a first diode and a second diode that interrupt electric power. This step-down chopper circuit includes a first direct-current power supply and a second direct-current power supply connected in series to each other, a first switching device connected to the positive side of the first direct-current power supply, and a second switching device connected to the negative side of the second direct-current power supply. This step-down chopper circuit further includes the first diode connected in parallel to the first direct-current power supply and the second diode connected in parallel to the second direct-current power supply. The step-down chopper circuit further includes a smoothing reactor. The step-down chopper circuit steps down the voltages of the first direct-current power supply and the second direct-current power supply with the smoothing reactor, and supplies electric power to a load.

Japanese Patent Laying-Open No. 2013-038921 discloses a boost chopper circuit including a first diode and a second diode that interrupt electric power. This boost chopper circuit includes a first transistor and a second transistor connected in series to each other. This boost chopper circuit further includes a first capacitor and a second capacitor connected in series to each other and connected to both ends of the first transistor and the second transistor through the first diode and the second diode, respectively. A connection point between the first transistor (first switching device) and the second transistor (second switching device) is connected to the first capacitor and the second capacitor. The boost chopper circuit further includes a coil. The boost chopper circuit boosts the voltage of a direct-current power supply with the coil and supplies electric power to a load.

In the step-down chopper circuit described in Japanese Patent Laying-Open No. 4-200268 and the boost chopper circuit described in Japanese Patent Laying-Open No. 2013-038921 (hereinafter referred to as a "conventional chopper circuit"), one of the first diode and the second diode may have a short-circuit fault due to a surge voltage (reverse recovery surge) or the like during reverse recovery. In this case, in the conventional chopper circuit, both the first switching device and the second switching device are controlled to be turned off. However, in the conventional chopper circuit, a current from a capacitor circuit passes through the short-circuited first diode and flows back to the direct-current power supply even if the first switching device and the second switching device are turned off when the first diode has a short-circuit fault and the voltage value of the load side (a capacitor or the first capacitor; hereinafter referred to as the "capacitor circuit") is larger than that of the direct-current power supply, for example. Then, the current flows back from the direct-current power supply to the second switching device. In this case, the second switching device may degrade or fail. For example, a current flows through a body diode (parasitic diode) of the second switching device such that the performance of the second switching device may degrade, or a leakage current is generated from the second switching device to generate heat such that the second switching device may fail. Therefore, in the conventional chopper circuit, the first switching device or the second switching device may degrade or fail due to the short-circuit fault of the first diode or the second diode.

SUMMARY OF THE INVENTION

The present invention has been proposed in order to solve the aforementioned problem, and an object of the present invention is to provide a chopper circuit capable of significantly reducing the degradation and failure of a first switching device or a second switching device due to the short-circuit fault of a first diode or a second diode.

In order to attain the aforementioned object, a chopper circuit according to an aspect of the present invention includes a reactor, a direct-current output circuit, a capacitor circuit connected to a load, a first diode and a second diode each connected to the capacitor circuit, a first switching device connected in series to the first diode, a second switching device connected in series to the second diode, a short circuit detector that detects a short circuit of the first diode and a short circuit of the second diode, and a controller that performs control of turning on the second switching device when the short circuit detector detects the short circuit of the first diode, and performs control of turning on the first switching device when the short circuit detector detects the short circuit of the second diode. In general, the term "circuit" indicates a system of conductors connected to each other without an end, but in this description, the term "circuit" indicates a wider concept including the case where a "path of a current" has an end. In addition, the term "turning on" indicates transitioning the first switching device or the second switching device into a conducting state.

In the chopper circuit according to this aspect of the present invention, as hereinabove described, the controller performs control of turning on the second switching device when the short circuit detector detects the short circuit of the first diode, and performs control of turning on the first switching device when the short circuit detector detects the short circuit of the second diode. Thus, even when the first diode has a short-circuit fault and a current flows back from the capacitor circuit to the second switching device, the second switching device is turned on, and hence the flow of a current through a body diode (parasitic diode) of the second switching device and the generation of a leakage current are significantly reduced or prevented. The current that flows back is conducted (returns). Furthermore, even when the second diode has a short-circuit fault and a current flows back from the capacitor circuit to the first switching device, the first switching device is turned on, and hence the current that flows back is conducted (returns) similarly to the second switching device. Consequently, the degradation and failure of the first switching device or the second switching device can be significantly reduced or prevented. Therefore, the degradation and failure of the first switching device or the second switching device due to the short-circuit fault of the first diode or the second diode can be significantly reduced or prevented.

The aforementioned chopper circuit according to this aspect preferably further includes a voltage detector that detects a voltage value of the capacitor circuit, and the controller preferably performs control of turning on the second switching device when the short circuit detector detects the short circuit of the first diode and the voltage value of the capacitor circuit detected by the voltage detector is larger than a voltage value of a positive pole of the direct-current output circuit, and performs control of turning on the first switching device when the short circuit detector detects the short circuit of the second diode and the voltage value of the capacitor circuit detected by the voltage detector is larger than the voltage value of the positive pole of the direct-current output circuit. When the first diode has a short-circuit fault and the voltage value of the capacitor circuit is larger than the voltage value of the positive pole of the direct-current output circuit, a current flows back to the direct-current output circuit and the second switching device. When the second diode has a short-circuit fault and the voltage value of the capacitor circuit is larger than the voltage value of the positive pole of the direct-current output circuit, a current flows back to the direct-current output circuit and the first switching device. In view of these points, according to the present invention, when a current flows back to the first switching device or a current flows back to the second switching device, the first switching device or the second switching device is turned on such that the current that flows back can be conducted.

In this case, the chopper circuit preferably further includes a current direction detector that detects a flow direction of a current that flows through the reactor, and the controller preferably performs control of switching the second switching device from an off-state to an on-state based on reverse of the flow direction of the current detected by the current direction detector when the short circuit detector detects the short circuit of the first diode and the voltage value of the capacitor circuit detected by the voltage detector is larger than the voltage value of the positive pole of the direct-current output circuit. According to this structure, when the chopper circuit is configured as a step-down chopper circuit, for example, the second switching device is turned off until the time point when a current flows back from the capacitor circuit to the direct-current output circuit if the first diode has a short-circuit fault, whereby electric power supply from the direct-current output circuit to the capacitor circuit can be stopped. Thus, continued electrical charging to the capacitor circuit can be prevented. Consequently, electrical charging to the capacitor circuit is prevented, and hence an increase in reached voltage (charging voltage) at the time point when the capacitor circuit starts to be discharged can be significantly reduced or prevented, and hence an increase in the amount of current that flows back can be significantly reduced or prevented. Furthermore, when the chopper circuit is configured as a boost chopper circuit, the second switching device is turned off until the time point when a current flows back from the capacitor circuit to the direct-current output circuit if the first diode has a short-circuit fault, whereby continued electrical charging to only a capacitor included in the capacitor circuit can be prevented. Consequently, the electrical charging to only the capacitor included in the capacitor circuit is prevented, and hence the withstand breakdown of this capacitor can be prevented. Then, at the time point when the capacitor circuit starts to be discharged and a current flows back to the direct-current output circuit and the second switching device, the second switching device is turned on, whereby the degradation and failure of the second switching device can be significantly reduced or prevented.

In the aforementioned chopper circuit including the voltage detector and the current direction detector, the controller preferably performs control of switching the second switching device from the off-state to the on-state based on the reverse of the flow direction of the current detected by the current direction detector from a direction in which a capacitor of the capacitor circuit is charged to a direction in which the capacitor of the capacitor circuit is discharged when the short circuit detector detects the short circuit of the first diode and the voltage value of the capacitor circuit detected by the voltage detector is larger than the voltage value of the positive pole of the direct-current output circuit. According to this structure, when the chopper circuit is configured as a step-down chopper circuit, for example, the flow of the current in the direction in which the capacitor circuit is charged is prevented even if the short circuit of the first diode is detected, whereby an increase in reached voltage at the time point when the capacitor circuit starts to be discharged can be significantly reduced or prevented. Furthermore, when the chopper circuit is configured as a boost chopper circuit, continued electrical charging to only the capacitor included in the capacitor circuit can be prevented even if the short circuit of the first diode is detected, whereby the withstand breakdown of this capacitor can be prevented. Then, at the time point when the capacitor circuit starts to be discharged and a current flows back to the second switching device, the second switching device is turned on, whereby the degradation and failure of the second switching device can be significantly reduced or prevented.

In the aforementioned chopper circuit including the voltage detector, the controller preferably performs control of turning off the second switching device when the short circuit detector detects the short circuit of the first diode and the voltage value of the capacitor circuit detected by the voltage detector is smaller than the voltage value of the positive pole of the direct-current output circuit. According to this structure, when the voltage value of the capacitor circuit is smaller than the voltage value of the positive pole of the direct-current output circuit, the second switching device is turned off such that continued electrical charging to the capacitor circuit can be prevented. When the first diode has a short-circuit fault, no current flows back to the second switching device if the voltage value of the capacitor circuit is smaller than the voltage value of the positive pole of the direct-current output circuit, and hence the degradation and failure of the second switching device can be significantly reduced or prevented even when the second switching device is turned off.

The aforementioned chopper circuit according to this aspect preferably further includes a first antiparallel diode connected in anti-parallel to the first switching device and a second antiparallel diode connected in anti-parallel to the second switching device. According to this structure, when a current flows back to the first switching device, the current that flows back also flows to the first antiparallel diode, and hence the amount of current that flows back to the first switching device can be reduced. When a current flows back to the second switching device, the current that flows back also flows to the second antiparallel diode, and hence the amount of current that flows back to the second switching device can be reduced. Consequently, the degradation and failure of the first switching device and the second switching device can be more reliably significantly reduced or prevented.

In the aforementioned chopper circuit according to this aspect, the first switching device and the second switching device each preferably include a wide band gap semiconductor. According to this structure, the first switching device and the second switching device, each of which includes the wide band gap semiconductor, are used, whereby a switching loss can be reduced as compared with the case where switching devices, each of which includes a common silicon semiconductor, are used. Consequently, an electric power loss can be reduced when the chopper circuit is driven.

In the aforementioned chopper circuit according to this aspect, the chopper circuit is preferably a step-down chopper circuit, the capacitor circuit preferably includes a capacitor for a step-down chopper connected in series to the reactor, the first diode and the second diode are preferably connected to both ends of the capacitor for the step-down chopper through the reactor, and are preferably connected in series to each other, and the direct-current output circuit preferably includes a first output circuit, a positive pole of which is connected to the first switching device and a negative pole of which is connected to an anode of the first diode, and a second output circuit, a positive pole of which is connected to the negative pole of the first output circuit and a cathode of the second diode and a negative pole of which is connected to the second switching device. According to this structure, the step-down chopper circuit capable of significantly reducing or preventing the degradation and failure of the first switching device or the second switching device due to the short-circuit fault of the first diode or the second diode can be provided.

In the aforementioned chopper circuit according to this aspect, the chopper circuit is preferably a boost chopper circuit, the first switching device and the second switching device are preferably connected to both ends of the direct-current output circuit through the reactor, and are preferably connected in series to each other, and the capacitor circuit preferably includes a first capacitor for a boost chopper connected to the first switching device and connected to the first diode, and a second capacitor for the boost chopper connected to the second switching device and connected to the second diode. According to this structure, the boost chopper circuit capable of significantly reducing or preventing the degradation and failure of the first switching device or the second switching device due to the short-circuit fault of the first diode or the second diode can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment

The structure of a step-down chopper circuit 100 according to a first embodiment is now described with reference to FIG. 1. The step-down chopper circuit 100 is an example of a "chopper circuit" in the claims.

(Structure of Step-Down Chopper Circuit)

Figure 1:
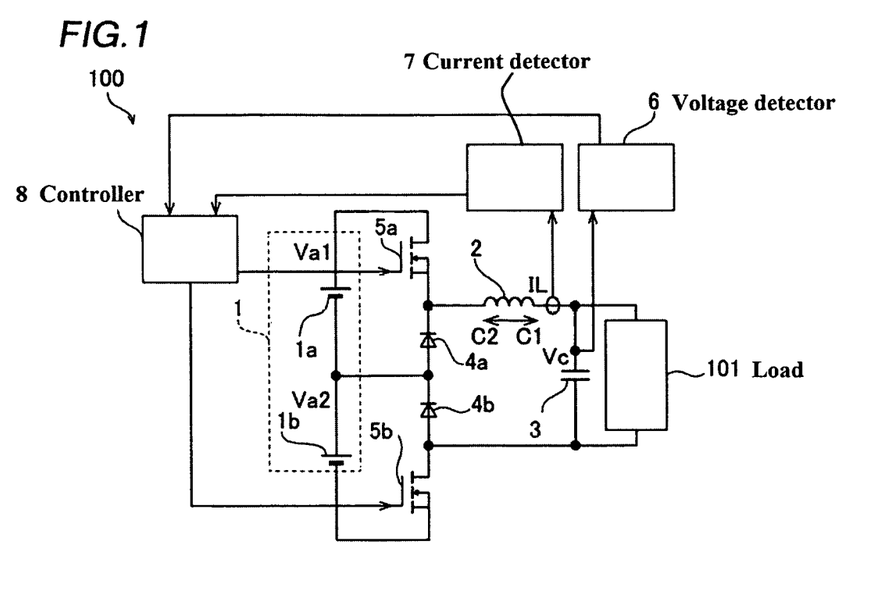
FIG. 1 is an electrical diagram showing the overall structure of a step-down chopper circuit according to a first embodiment of the present invention.

As shown in FIG. 1, the step-down chopper circuit 100 includes a direct-current output circuit 1. The direct-current output circuit 1 is configured to step down the voltages of a first direct-current output circuit 1a and a second direct-current output circuit 1b connected in series to each other and apply the stepped-down voltages to a load 101. More specifically, the step-down chopper circuit 100 is configured to apply, to the load 101, a voltage having a voltage value smaller than the sum of the voltage value of a positive pole of the first direct-current output circuit 1a and the voltage value of a positive pole of the second direct-current output circuit 1b. The step-down chopper circuit 100 is configured as a so-called three-level step-down chopper circuit. In general, the term "circuit" indicates a system of conductors connected to each other without an end, but in this description, the term "circuit" indicates a wider concept including the case where a "path of a current" has an end. The first direct-current output circuit 1a is an example of a "direct-current output circuit" or a "first output circuit" in the claims. The second direct-current output circuit 1b is an example of a "direct-current output circuit" or a "second output circuit" in the claims.

The first direct-current output circuit 1a and the second direct-current output circuit 1b are configured as direct-current power supplies or capacitors. When the first direct-current output circuit 1a and the second direct-current output circuit 1b are configured as capacitors, an alternating-current power supply or a direct-current power supply may be further provided separately. When a rotating electrical machine is provided as an alternating-current power supply, for example, the step-down chopper circuit 100 is configured to return electric power from the rotating electrical machine to the load 101 (such as a battery).

The step-down chopper circuit 100 includes a reactor 2, a capacitor 3, a first diode 4a, a second diode 4b, a first switching device 5a, a second switching device 5b, a voltage detector 6, a current detector 7, and a controller 8. The current detector 7 is an example of a "current direction detector" or a "short circuit detector" in the claims. The controller 8 is an example of a "controller" or a "short circuit detector" in the claims. The capacitor 3 is an example of a "capacitor circuit" or a "capacitor for a step-down chopper"

in the claims. In FIG. 1, the capacitor 3 is illustrated as one capacitor, but the capacitor 3 may include one or more capacitors.

The capacitor 3 is connected to both ends of the load 101. The capacitor 3 is connected in series to the reactor 2, and a positive terminal of the capacitor 3 and one end of the reactor 2 are connected to each other.

The first diode 4a and the second diode 4b are connected in series to each other. More specifically, an anode of the first diode 4a and a cathode of the second diode 4b are connected to each other. A cathode of the first diode 4a and the other end of the reactor 2 are connected to each other, and an anode of the second diode 4b and a negative terminal of the capacitor 3 are connected to each other. More specifically, the first diode 4a and the second diode 4b are connected to both ends of the capacitor 3 through the reactor 2. Thus, the reactor 2, the capacitor 3, the first diode 4a, and the second diode 4b form a series circuit.

According to the first embodiment, the first switching device 5a and the second switching device 5b each include a wide band gap semiconductor. Specifically, the first switching device 5a and the second switching device 5b each include a semiconductor device, the band gap of which is larger (wider) than that of a silicon semiconductor such as SiC, GaN, diamond, AlN, AlGaN, Ga$_2$O$_3$, or ZnO. Furthermore, the first switching device 5a and the second switching device 5b each are a SiC-MOSFET or a bipolar transistor. The first switching device 5a and the second switching device 5b each are configured as a SiC-MOSFET, for example. In FIG. 1, the first switching device 5a and the second switching device 5b each are illustrated as a MOSFET, but each of the first switching device 5a and the second switching device 5b may be a bipolar transistor, as described above.

Each of the first diode 4a and the second diode 4b preferably includes the above-described wide band gap semiconductor. In this case, the first diode 4a and the second diode 4b can reduce a reverse recovery loss as compared with the case where the first diode 4a and the second diode 4b each include a silicon semiconductor.

The first switching device 5a is connected in series to the first diode 4a. Specifically, a source of the first switching device 5a and a cathode of the first diode 4a are connected to each other. A drain of the first switching device 5a and the positive pole of the first direct-current output circuit 1a are connected to each other. A negative pole of the first direct-current output circuit 1a is connected to the anode of the first diode 4a and the cathode of the second diode 4b.

The second switching device 5b is connected in series to the second diode 4b. Specifically, a drain of the second switching device 5b and the anode of the second diode 4b are connected to each other. A source of the second switching device 5b and a negative pole of the second direct-current output circuit 1b are connected to each other. The positive pole of the second direct-current output circuit 1b is connected to the anode of the first diode 4a and the cathode of the second diode 4b.

The voltage detector 6 is connected to the positive terminal of the capacitor 3, and detects the voltage value Vc of the positive terminal of the capacitor 3. The voltage detector 6 transmits the detected voltage value Vc to the controller 8.

The current detector 7 can detect the flow direction of a current that flows through the reactor 2 and the current value IL of the current that flows through the reactor 2. The current detector 7 transmits the detected flow direction of the current (along arrow C1 or arrow C2 in FIG. 1) and the current value IL to the controller 8.

<Structure of Controller>

The controller 8 is connected to a gate of the first switching device 5a and a gate of the second switching device 5b, and controls a time ratio (duty) of turning on and turning off (switching operation) of each of the first switching device 5a and the second switching device 5b. The controller 8 can adjust (control) a voltage value (stepping down) and a current value (the current value IL of the current that flows through the reactor 2) with respect to the load 101 of the step-down chopper circuit 100 by controlling the time ratio of turning on and turning off of each of the first switching device 5a and the second switching device 5b.

According to the first embodiment, the controller 8 detects the short circuit of the first diode 4a and the short circuit of the second diode 4b based on the detection result of the current detector 7. Specifically, the controller 8 determines that a short circuit occurs in either the first diode 4a or the second diode 4b when a current flows through the reactor 2, regardless of the operation of turning on or off the first switching device 5a and the second switching device 5b.

For example, the controller 8 compares the current value IL with a predetermined threshold ILt previously stored and detects a short circuit when the current value IL exceeds the predetermined threshold ILt. In this case, the controller 8 detects (determines) whether or not either the first diode 4a or the second diode 4b is short-circuited by associating a time point at which the current value IL exceeds the predetermined threshold ILt with the operating states of the first switching device 5a and the second switching device 5b. The predetermined threshold ILt is not restricted to one value, but a plurality of values may be set.

When the first diode 4a has a short-circuit fault and the voltage value Vc of the capacitor 3 is higher than the voltage value Va2 of the second direct-current output circuit 1b, a current flows back through the capacitor 3, the reactor 2, the short-circuited first diode 4a, the second direct-current output circuit 1b, and the second switching device 5b in this order. At this time, when the second switching device 5b is turned off, a current flows through a body diode (parasitic diode) of the second switching device 5b (in the case of a MOSFET), and the second switching device 5b may degrade or fail due to heat generation. Also when the second diode 4b has a short-circuit fault, the first switching device 5a may degrade or fail if the voltage value Vc of the capacitor 3 is higher than the voltage value Va1 of the first direct-current output circuit 1a and the first switching device 5a is turned off.

According to the first embodiment, the controller 8 performs control of turning on the second switching device 5b (transitioning the second switching device 5b into a conducting state) when detecting the short circuit of the first diode 4a, and performs control of turning on the first switching device 5a (transitioning the first switching device 5a into a conducting state) when detecting the short circuit of the second diode 4b.

Specifically, the controller 8 performs control of turning on the second switching device 5b when the controller 8 detects the short circuit of the first diode 4a and the voltage value Vc of the capacitor 3 detected by the voltage detector 6 is larger than the voltage value Va2 of the positive pole of the second direct-current output circuit 1b. Information about the voltage value Va2 may be previously stored in the step-down chopper circuit 100, or a voltage detector may be provided to acquire the information.

More specifically, the controller 8 performs control of switching the second switching device 5b from an off-state (disconnecting state) to an on-state (conducting state) based on the reverse of the flow direction of the current detected by the current detector 7 from a direction in which the capacitor 3 is charged (a direction along arrow C1 in FIG. 1) to a direction in which the capacitor 3 is discharged (a direction along arrow C2 in FIG. 1) (at the time point of reverse) when the controller 8 detects the short circuit of the first diode 4a and the voltage value Vc of the capacitor 3 is larger than the voltage value Va2 of the positive pole of the second direct-current output circuit 1b. At this time, the controller 8 controls the first switching device 5a to be in an off-state.

Thus, the second switching device 5b conducts when a current flows back to the second switching device 5b, and hence a current can return without flowing through the body diode of the second switching device 5b, and the degradation and failure of the second switching device 5b are significantly reduced or prevented.

Even when the controller 8 detects the short circuit of the first diode 4a, no current flows back if the voltage value Vc of the capacitor 3 detected by the voltage detector 6 is smaller than the voltage value Va2 of the positive pole of the second direct-current output circuit 1b, and hence the controller 8 performs control of turning off the second switching device 5b (and the first switching device 5a).

The controller 8 performs control of turning on the first switching device 5a when the controller 8 detects the short circuit of the second diode 4b and the voltage value Vc of the capacitor 3 detected by the voltage detector 6 is larger than the voltage value Va1 of the positive pole of the first direct-current output circuit 1a. Information about the voltage value Va1 may be previously stored in the step-down chopper circuit 100, or a voltage detector may be provided to acquire the information, similarly to the above voltage value Va2.

More specifically, the controller 8 performs control of switching the first switching device 5a from an off-state (disconnecting state) to an on-state (conducting state) based on the reverse of the flow direction of the current detected by the current detector 7 from the direction in which the capacitor 3 is charged (the direction along arrow C1 in FIG. 1) to the direction in which the capacitor 3 is discharged (the direction along arrow C2 in FIG. 1) (at the time point of reverse) when the controller 8 detects the short circuit of the second diode 4b and the voltage value Vc of the capacitor 3 is larger than the voltage value Va1 of the positive pole of the first direct-current output circuit 1a. At this time, the controller 8 controls the second switching device 5b to be in an off-state.

Thus, the first switching device 5a conducts when a current flows back to the first switching device 5a, and hence a current can return without flowing through a body diode of the first switching device 5a, and the degradation and failure of the first switching device 5a are significantly reduced or prevented.

Even when the controller 8 detects the short circuit of the second diode 4b, no current flows back if the voltage value Vc of the capacitor 3 detected by the voltage detector 6 is smaller than the voltage value Va1 of the positive pole of the first direct-current output circuit 1a, and hence the controller 8 performs control of turning off the first switching device 5a (and the second switching device 5b).

The load 101 may be configured as a battery (direct-current power supply) or a combination of an inverter including a plurality of switching devices and an electric motor, for example. When the load 101 is configured as a battery, the load 101 is configured to be charged by electric power (regenerative electric power) from the direct-current output circuit 1. When the load 101 includes an electric motor, the load 101 is configured to consume electric power to be driven.

(Operation of Step-Down Chopper Circuit)
<Operation during Normal Operation>

The operation of the step-down chopper circuit 100 according to the first embodiment during normal operation is now described with reference to FIG. 1. The operation of the step-down chopper circuit 100 is performed by control processing of the controller 8.

When the first switching device 5a is turned on and the second switching device 5b is turned off, a current flows through the first direct-current output circuit 1a, the first switching device 5a, the reactor 2, the capacitor 3, and the second diode 4b in this order.

When the first switching device 5a is turned off and the second switching device 5b is turned on, a current flows through the second direct-current output circuit 1b, the first diode 4a, the reactor 2, the capacitor 3, and the second switching device 5b in this order.

When the first switching device 5a is turned on and the second switching device 5b is turned on, a current flows through the first direct-current output circuit 1a, the first switching device 5a, the reactor 2, the capacitor 3, the second switching device 5b, and the second direct-current output circuit 1b in this order.

When the first switching device 5a is turned off and the second switching device 5b is turned off, a current flows through the reactor 2, the capacitor 3, the second diode 4b, and the first diode 4a in this order.

In the step-down chopper circuit 100, the controller 8 controls each time period (time ratio) of the above operation, and the above operation is repeated such that (converted) electric power, the voltage of which has been stepped down relative to the voltages of the first direct-current output circuit 1a and the second direct-current output circuit 1b is supplied to the load 101.

<Operation during Short Circuit Detection>

The operation of the step-down chopper circuit 100 according to the first embodiment during short circuit detection is now described with reference to FIGS. 1 and 2. The operation of the step-down chopper circuit 100 is performed by control processing of the controller 8.

Figure 2:
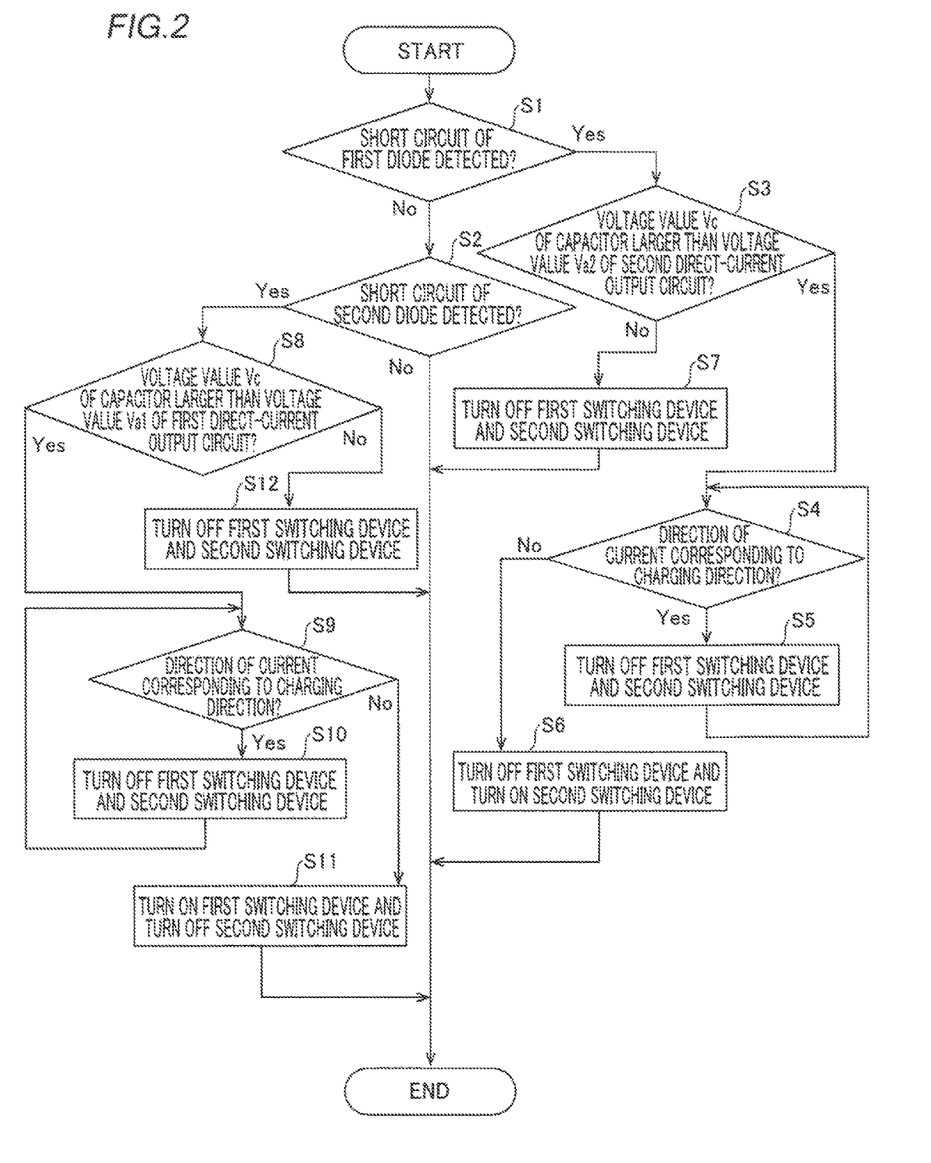
FIG. 2 is a flowchart for illustrating the control operation of the step-down chopper circuit according to the first embodiment of the present invention.

As shown in FIG. 2, the controller 8 determines whether or not the short circuit of the first diode 4a has been detected at a step S1. When determining that the short circuit of the first diode 4a has not been detected, the controller 8 advances to a step S2, and when determining that the short circuit of the first diode 4a has been detected, the controller 8 advances to a step S3.

At the step S2, the controller 8 determines whether or not the short circuit of the second diode 4b has been detected. When determining that the short circuit of the second diode 4b has been detected, the controller 8 advances to a step S8, and when determining that the short circuit of the second diode 4b has not been detected, the controller 8 terminates the operation of the step-down chopper circuit 100 during short circuit detection.

The above steps S1 and S2 are repeated in the above operation during normal operation such that the short circuit can be detected in the operation during normal operation.

At the step S3 to which the controller 8 advances when determining that the short circuit of the first diode 4a has been detected at the step S1, the controller 8 determines whether or not the voltage value Vc of the capacitor 3 is larger than the voltage value Va2 of the positive pole of the second direct-current output circuit 1b. When determining that the voltage value Vc is larger than the voltage value Va2, the controller 8 advances to a step S4, and when determining that the voltage value Vc is not larger than the voltage value Va2, the controller 8 advances to a step S7.

At the step S4, the controller 8 determines whether or not the direction of the current that flows through the reactor 2 is the direction in which the capacitor 3 is charged. More specifically, the controller 8 determines whether the direction of the current that flows through the reactor 2 is the direction in which the capacitor 3 is charged (the direction along arrow C1 in FIG. 1) or the direction in which the capacitor 3 is discharged (the direction along arrow C2). When determining that the direction of the current that flows through the reactor 2 is the direction in which the capacitor 3 is charged, the controller 8 advances to a step S5, and when determining that the direction of the current that flows through the reactor 2 is not the direction in which the capacitor 3 is charged, the controller 8 advances to a step S6.

At the step S5, both the first switching device 5a and the second switching device 5b are turned off. As shown in FIG. 1, even when the first diode 4a has a short-circuit fault, a current flows in the direction in which the capacitor 3 is charged (through the first diode 4a, the reactor 2, the capacitor 3, and the second diode 4b in this order) for a while, and hence a resonant circuit of the capacitor 3 and the reactor 2 is formed. Thus, both the first switching device 5a and the second switching device 5b are turned off such that electrical charging from the first direct-current output circuit 1a and the second direct-current output circuit 1b to the capacitor 3 can be prevented. Therefore, the electrical charging is prevented, and hence an increase in reached voltage (charging voltage) at the time point when the capacitor 3 starts to be discharged can be significantly reduced or prevented.

Then, the controller 8 returns to the step S4. More specifically, the controller 8 repeats the steps S4 and S5 until the direction of the current that flows through the reactor 2 is no longer the direction in which the capacitor 3 is charged. At the time point when the direction of the current that flows through the reactor 2 is reversed from the direction in which the capacitor 3 is charged to the direction in which the capacitor 3 is discharged, the controller 8 advances to the step S6. The time point when the direction of the current that flows through the reactor 2 is reversed from the direction in which the capacitor 3 is charged to the direction in which the capacitor 3 is discharged is the time point when the current starts to flow back.

At the step S6, the first switching device 5a is turned off whereas the second switching device 5b is turned on. Thus, the current that flows back through the capacitor 3, the reactor 2, the short-circuited first diode 4a, and the second direct-current output circuit 1b in this order flows through the second switching device 5b in an on-state without flowing through the body diode of the second switching device 5b. Then, the electrical discharging of the capacitor 3 is terminated. Then, the controller 8 terminates the operation of the step-down chopper circuit 100 during short circuit detection.

At the step S7 to which the controller 8 advances when determining that the voltage value Vc is not larger than the voltage value Va2 at the step S3, both the first switching device 5a and the second switching device 5b are turned off. In this case, a current hardly flows back, and hence both the first switching device 5a and the second switching device 5b are turned off such that the operation of the step-down chopper circuit 100 is stopped. Then, the controller 8 terminates the operation of the step-down chopper circuit 100 during short circuit detection.

At the step S8 to which the controller 8 advances when determining that the short circuit of the second diode 4b has been detected at the step S2, the controller 8 determines whether or not the voltage value Vc of the capacitor 3 is larger than the voltage value Va1 of the positive pole of the first direct-current output circuit 1a. When determining that the voltage value Vc is larger than the voltage value Va1, the controller 8 advances to a step S9, and when determining that the voltage value Vc is not larger than the voltage value Va1, the controller 8 advances to a step S12.

At the step S9, the controller 8 determines whether or not the direction of the current that flows through the reactor 2 is the direction in which the capacitor 3 is charged. When determining that the direction of the current that flows through the reactor 2 is the direction in which the capacitor 3 is charged, the controller 8 advances to a step S10, and when determining that the direction of the current that flows through the reactor 2 is not the direction in which the capacitor 3 is charged, the controller 8 advances to a step S11.

At the step S10, both the first switching device 5a and the second switching device 5b are turned off. Then, the controller 8 returns to the step S9.

At the step S11, the first switching device 5a is turned on, and the second switching device 5b is turned off. Thus, the current that flows back through the capacitor 3, the reactor 2, the first switching device 5a, the first direct-current output circuit 1a, and the short-circuited second diode 4b in this order flows through the first switching device 5a in an on-state without flowing through the body diode of the first switching device 5a. Then, the electrical discharging of the capacitor 3 is terminated. Then, the controller 8 terminates the operation of the step-down chopper circuit 100 during short circuit detection.

At the step S12 to which the controller 8 advances when determining that the voltage value Vc is not larger than the voltage value Va1 at the step S8, both the first switching device 5a and the second switching device 5b are turned off. Then, the controller 8 terminates the operation of the step-down chopper circuit 100 during short circuit detection.

Effects of First Embodiment

According to the first embodiment, the following effects can be obtained.

According to the first embodiment, as hereinabove described, the controller 8 performs control of turning on the second switching device 5b when detecting the short circuit of the first diode 4a, and performs control of turning on the first switching device 5a when detecting the short circuit of the second diode 4b. Thus, even when the first diode 4a has a short-circuit fault and a current flows back from the capacitor 3 to the second switching device 5b, the second switching device 5b is turned on, and hence the flow of a current through the body diode of the second switching device 5b and the generation of a leakage current are significantly reduced or prevented. The current that flows back is conducted (returns). Furthermore, even when the second diode 4b has a short-circuit fault and a current flows back from the capacitor 3 to the first switching device 5a, the first switching device 5a is turned on, and hence the flow of a current through the body diode of the first switching device 5a and the generation of a leakage current are significantly reduced or prevented. The current that flows back is conducted (returns). Consequently, the degradation and failure of the first switching device 5a or the second switching device 5b can be significantly reduced or prevented. Therefore, the degradation and failure of the first switching device 5a or the second switching device 5b due to the short-circuit fault of the first diode 4a or the second diode 4b can be significantly reduced or prevented.

According to the first embodiment, as hereinabove described, the step-down chopper circuit 100 includes the voltage detector 6 that detects the voltage value Vc of the capacitor 3. Furthermore, the controller 8 performs control of turning on the second switching device 5b when the controller 8 detects the short circuit of the first diode 4a and the voltage value Vc of the capacitor 3 detected by the voltage detector 6 is larger than the voltage value Va2 of the positive pole of the second direct-current output circuit 1b, and performs control of turning on the first switching device 5a when the controller 8 detects the short circuit of the second diode 4b and the voltage value Vc of the capacitor 3 detected by the voltage detector 6 is larger than the voltage value Va1 of the positive pole of the first direct-current output circuit 1a. When the first diode 4a has a short-circuit fault and the voltage value Vc of the capacitor 3 is larger than the voltage value Va2 of the positive pole of the second direct-current output circuit 1b, a current flows back to the second direct-current output circuit 1b and the second switching device 5b. When the second diode 4b has a short-circuit fault and the voltage value Vc of the capacitor 3 is larger than the voltage value Va1 of the positive pole of the first direct-current output circuit 1a, a current flows back to the first direct-current output circuit 1a and the first switching device 5a. In view of this point, according to the first embodiment, when a current flows back to the first switching device 5a or a current flows back to the second switching device 5b, the first switching device 5a or the second switching device 5b is turned on such that the current that flows back can be conducted.

According to the first embodiment, as hereinabove described, the step-down chopper circuit 100 includes the current detector 7 that detects the flow direction of the current that flows through the reactor 2. Furthermore, the controller 8 performs control of switching the second switching device 5b from an off-state to an on-state based on the reverse of the flow direction of the current detected by the current detector 7 when the controller 8 detects the short circuit of the first diode 4a and the voltage value Vc of the capacitor 3 detected by the voltage detector 6 is larger than the voltage value Va2 of the positive pole of the second direct-current output circuit 1b. Thus, when the first diode 4a has a short-circuit fault, the second switching device 5b is turned off until the time point when a current flows back from the capacitor 3 to the second direct-current output circuit 1b, whereby electric power supply from the second direct-current output circuit 1b to the capacitor 3 can be stopped. Thus, continued electrical charging to the capacitor 3 can be prevented. Consequently, electrical charging to the capacitor 3 is prevented, and hence an increase in reached voltage at the time point when the capacitor 3 starts to be discharged can be significantly reduced or prevented, and hence an increase in the amount of current that flows back can be significantly reduced or prevented. Furthermore, at the time point when the capacitor 3 starts to be discharged and a current flows back to the second direct-current output circuit 1b and the second switching device 5b, the second switching device 5b is turned on, whereby the degradation and failure of the second switching device 5b can be significantly reduced or prevented.

According to the first embodiment, as hereinabove described, the controller 8 performs control of switching the second switching device 5b from an off-state to an on-state based on the reverse of the flow direction of the current detected by the current detector 7 from the direction in which the capacitor 3 is charged (the direction along arrow C1 in FIG. 1) to the direction in which the capacitor 3 is discharged (the direction along arrow C2 in FIG. 1) when the controller 8 detects the short circuit of the first diode 4a and the voltage value Vc of the capacitor 3 detected by the voltage detector 6 is larger than the voltage value Va2 of the positive pole of the second direct-current output circuit 1b. Thus, even when the short circuit of the first diode 4a is detected, the flow of the current in the direction in which the capacitor 3 is charged is prevented such that an increase in reached voltage at the time point when the capacitor 3 starts to be discharged can be significantly reduced or prevented. Furthermore, at the time point when the capacitor 3 starts to be discharged and a current flows back to the second switching device 5b, the second switching device 5b is turned on, whereby the degradation and failure of the second switching device 5b can be significantly reduced or prevented.

According to the first embodiment, as hereinabove described, the controller 8 performs control of turning off the second switching device 5b when the controller 8 detects the short circuit of the first diode 4a and the voltage value Vc of the capacitor 3 detected by the voltage detector 6 is smaller than the voltage value Va2 of the positive pole of the second direct-current output circuit 1b. Thus, when the voltage value Vc of the capacitor 3 is smaller than the voltage value Va2 of the positive pole of the second direct-current output circuit 1b, the second switching device 5b is turned off such that continued electrical charging to the capacitor 3 can be prevented. When the first diode 4a has a short-circuit fault, no current flows back to the second switching device 5b if the voltage value Vc of the capacitor 3 is smaller than the voltage value Va2 of the positive pole of the second direct-current output circuit 1b, and hence the degradation and failure of the second switching device 5b can be significantly reduced or prevented even when the second switching device 5b is turned off.

According to the first embodiment, as hereinabove described, the first switching device 5a and the second switching device 5b each include the wide band gap semiconductor (such as a SiC-MOSFET). Thus, the first switching device 5a and the second switching device 5b, each of which includes the wide band gap semiconductor, are used, whereby a switching loss can be reduced as compared with the case where switching devices, each of which includes a common silicon semiconductor, are used. Consequently, an electric power loss can be reduced when the step-down chopper circuit 100 is driven.

According to the first embodiment, as hereinabove described, the step-down chopper circuit 100 includes the capacitor 3 connected in series to the reactor 2, the first diode 4a and the second diode 4b connected to both ends of the capacitor 3 through the reactor 2 and connected in series to each other, the first direct-current output circuit 1a, the positive pole of which is connected to the first switching device 5a and the negative pole of which is connected to the anode of the first diode 4a, and the second direct-current output circuit 1b, the positive pole of which is connected to the negative pole of the first direct-current output circuit 1a and the cathode of the second diode 4b and the negative pole of which is connected to the second switching device 5b. Thus, the step-down chopper circuit 100 capable of significantly reducing or preventing the degradation and failure of the first switching device 5a or the second switching device 5b due to the short-circuit fault of the first diode 4a or the second diode 4b can be provided.

Second Embodiment

The structure of a step-down chopper circuit 200 according to a second embodiment is now described with reference to FIG. 3. The step-down chopper circuit 200 according to the second embodiment includes a first antiparallel diode 209a connected in anti-parallel to a first switching device 5a and a second antiparallel diode 209b connected in anti-parallel to a second switching device 5b in addition to the structural elements of the step-down chopper circuit 100 according to the first embodiment. Portions of the step-down chopper circuit 200 similar to those of the step-down chopper circuit 100 according to the aforementioned first embodiment are denoted by the same reference numerals, to omit the description.

(Structure of Step-Down Chopper Circuit According to Second Embodiment)

Figure 3:
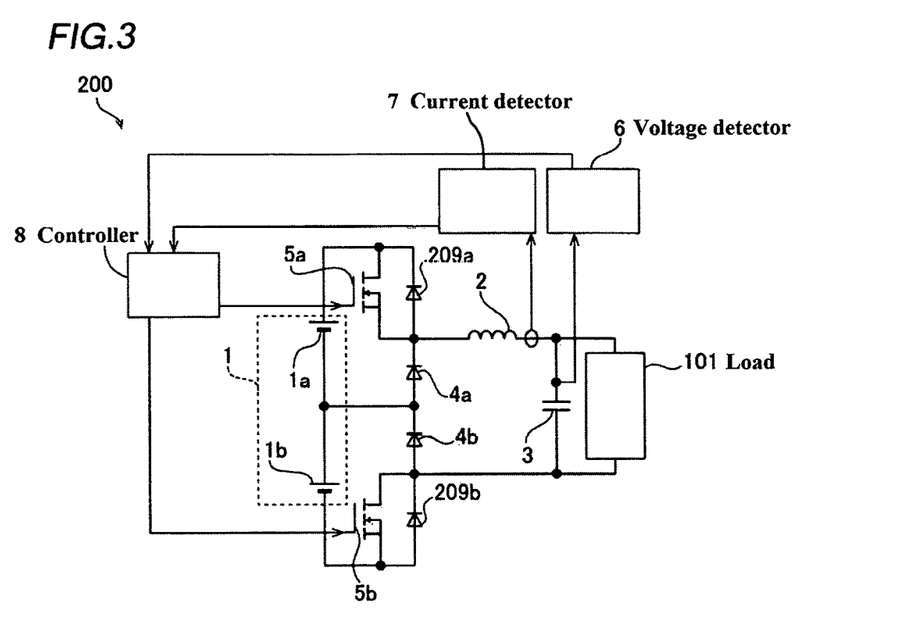
FIG. 3 is an electrical diagram showing the overall structure of a step-down chopper circuit according to a second embodiment of the present invention.

As shown in FIG. 3, the step-down chopper circuit 200 according to the second embodiment includes the first antiparallel diode 209a connected in anti-parallel to the first switching device 5a and the second antiparallel diode 209b connected in anti-parallel to the second switching device 5b.

The first antiparallel diode 209a and the second antiparallel diode 209b each include a silicon semiconductor (preferably a Si-PiN diode). In operation during normal operation, no current flows to the first antiparallel diode 209a and the second antiparallel diode 209b, and a loss (reverse recovery loss) is not influenced. Thus, even when the silicon semiconductor is used, an increase in electric power loss can be significantly reduced or prevented. The Si-PiN diode has the advantage that a reverse leakage current is smaller in the Si-PiN diode than in a SiC-SBD (Schottky barrier diode). Also at the time of return, the Si-PiN diode has the advantage that an on-voltage is lower in the Si-PiN diode than in the SiC-SBD. The first antiparallel diode 209a and the second antiparallel diode 209b each can also be configured as the SiC-SBD.

Specifically, a drain of the first switching device 5a and a cathode of the first antiparallel diode 209a are connected to each other. A source of the first switching device 5a and an anode of the first antiparallel diode 209a are connected to each other. A drain of the second switching device 5b and a cathode of the second antiparallel diode 209b are connected to each other. A source of the second switching device 5b and an anode of the second antiparallel diode 209b are connected to each other. The remaining structures of the step-down chopper circuit 200 according to the second embodiment are similar to those of the step-down chopper circuit 100 according to the first embodiment.

(Operation of Step-Down Chopper Circuit According to Second Embodiment during Short Circuit)

The operation of the step-down chopper circuit 200 according to the second embodiment during short circuit is now described with reference to FIG. 3. The control operation of the step-down chopper circuit 200 is performed by control processing of a controller 8.

When a first diode 4a has a short-circuit fault and a current starts to flow back from a capacitor 3 (electrical discharging starts), the second switching device 5b is turned on. The current that flows back flows from the capacitor 3 through a reactor 2, the short-circuited first diode 4a, a second direct-current output circuit 1b, the second switching device 5b, and the second antiparallel diode 209b. In this case, a current hardly flows through a body diode of the second switching device 5b, and a leakage current also hardly flows.

When a second diode 4b has a short-circuit fault and a current starts to flow back from the capacitor 3 (electrical discharging starts), the first switching device 5a is turned on. Then, the current that flows back flows to the first switching device 5a and the first antiparallel diode 209a. In this case, a current hardly flows through a body diode of the first switching device 5a, and a leakage current also hardly flows. The operation (see FIG. 2) of the step-down chopper circuit 200 according to the second embodiment during normal operation and during short circuit detection is similar to that of the step-down chopper circuit 100 according to the first embodiment.

Effects of Second Embodiment

According to the second embodiment, the following effects can be obtained.

According to the second embodiment, as hereinabove described, the step-down chopper circuit 200 includes the first antiparallel diode 209a connected in anti-parallel to the first switching device 5a and the second antiparallel diode 209b connected in anti-parallel to the second switching device 5b. Thus, when a current flows back to the first switching device 5a, the current that flows back also flows to the first antiparallel diode 209a, and hence the amount of current that flows back to the first switching device 5a can be reduced. When a current flows back to the second switching device 5b, the current that flows back also flows to the second antiparallel diode 209b, and hence the amount of current that flows back to the second switching device 5b can be reduced. Consequently, the degradation and failure of the first switching device 5a and the second switching device 5b can be more reliably significantly reduced or prevented. The remaining effects of the step-down chopper circuit 200 according to the second embodiment are similar to those of the step-down chopper circuit 100 according to the first embodiment.

Third Embodiment

The structure of a boost chopper circuit 300 according to a third embodiment is now described with reference to FIG. 4. The boost chopper circuit 300 is an example of a "chopper circuit" in the claims. Portions of the boost chopper circuit 300 similar to those of the step-down chopper circuits 100 and 200 according to the aforementioned first and second embodiments are denoted by the same reference numerals, to omit the description.

(Structure of Boost Chopper Circuit According to Third Embodiment)

Figure 4:
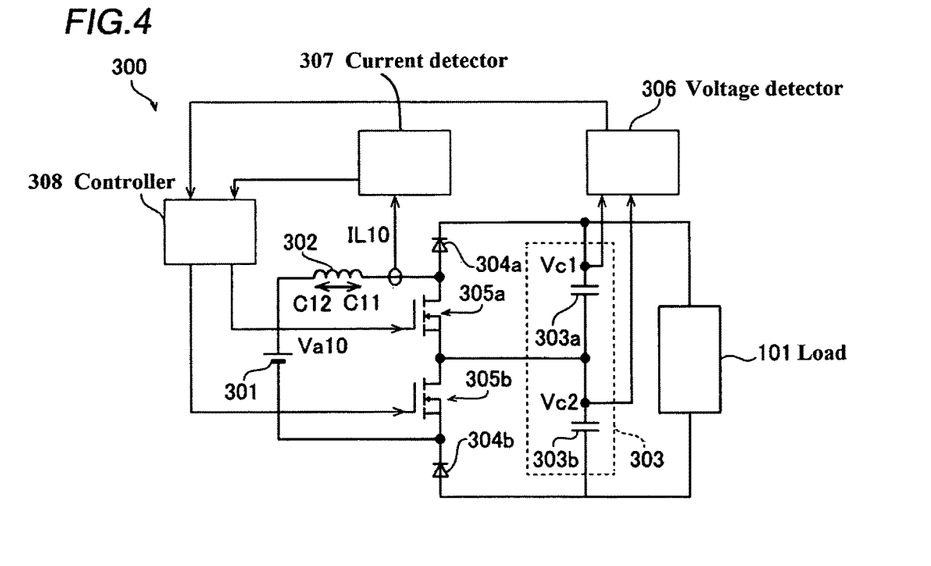
FIG. 4 is an electrical diagram showing the overall structure of a boost chopper circuit according to a third embodiment of the present invention.

As shown in FIG. 4, the boost chopper circuit 300 according to the third embodiment is configured to boost the voltage of a direct-current output circuit 301 and apply the boosted voltage to a load 101. More specifically, the boost chopper circuit 300 is configured to apply, to the load 101, a voltage having a voltage value larger than the voltage value Va10 of a positive pole of the direct-current output circuit 301. The boost chopper circuit 300 is configured as a so-called three-level boost chopper circuit.

The direct-current output circuit 301 is configured as a direct-current power supply or a capacitor. When the direct-current output circuit 301 is configured as a capacitor, an alternating-current power supply or a direct-current power supply may be further provided separately. When a rotating electrical machine is provided as an alternating-current power supply, for example, the boost chopper circuit 300 is configured to return electric power from the rotating electrical machine to the load 101 (such as a battery).

The boost chopper circuit 300 includes a reactor 302, a capacitor circuit 303, a first diode 304a, a second diode 304b, a first switching device 305a, a second switching device 305b, a voltage detector 306, a current detector 307, and a controller 308. The current detector 307 is an example of a "current direction detector" or a "short circuit detector" in the claims. The controller 308 is an example of a "controller" or a "short circuit detector" in the claims.

The capacitor circuit 303 is connected to both ends of the load 101. Specifically, the capacitor circuit 303 includes a first capacitor 303a and a second capacitor 303b connected in series to each other. A positive terminal of the first capacitor 303a is connected to one end of the load 101, and a negative terminal of the second capacitor 303b is connected to the other end of the load 101. A negative terminal of the first capacitor 303a and a positive terminal of the second capacitor 303b are connected to each other. In FIG. 4, each of the first capacitor 303a and the second capacitor 303b is illustrated as one capacitor, but each of the first capacitor 303a and the second capacitor 303b may include one or more capacitors. The first capacitor 303a is an example of a "first capacitor for a boost chopper" in the claims. The second capacitor 303b is an example of a "second capacitor for the boost chopper" in the claims.

The first capacitor 303a is connected in series to the reactor 302 and the direct-current output circuit 301 through the first diode 304a. The second capacitor 303b is connected in series to the reactor 302 and the direct-current output circuit 301 through the second diode 304b. Specifically, an anode of the first diode 304a is connected to one end of the reactor 302. The positive terminal of the first capacitor 303a is connected to a cathode of the first diode 304a. An anode of the second diode 304b is connected to the negative terminal of the second capacitor 303b. A negative pole of the direct-current output circuit 301 is connected to the cathode of the second diode 304b. The other end of the reactor 302 is connected to the positive pole of the direct-current output circuit 301.

Thus, the direct-current output circuit 301, the reactor 302, the first diode 304a, the first capacitor 303a, the second capacitor 303b, and the second diode 304b form a series circuit.

According to the third embodiment, the first switching device 305a and the second switching device 305b each include a wide band gap semiconductor similarly to the first switching device 5a and the second switching device 5b according to the first embodiment. In FIG. 4, each of the first switching device 305a and the second switching device 305b is illustrated as a MOSFET, but each of the first switching device 305a and the second switching device 305b may be a bipolar transistor. Each of the first diode 304a and the second diode 304b preferably includes the above-described wide band gap semiconductor.

The first switching device 305a is connected in series to the first diode 304a. Specifically, a drain or collector of the first switching device 305a and the anode of the first diode 304a are connected to each other. A source or emitter of the first switching device 305a and the positive terminal of the second capacitor 303b are connected to each other.

The second switching device 305b is connected in series to the second diode 304b. Specifically, a source or emitter of the second switching device 305b and the cathode of the second diode 304b are connected to each other. A drain or collector of the second switching device 305b and the negative terminal of the first capacitor 303a are connected to each other.

The voltage detector 306 is connected to the positive terminal of the first capacitor 303a and the positive terminal of the second capacitor 303b, and detects the voltage value Vc1 of the positive terminal of the first capacitor 303a and the voltage value Vc2 of the positive terminal of the second capacitor 303b. The voltage detector 306 transmits the detected voltage values Vc1 and Vc2 to the controller 308.

The current detector 307 can detect the flow direction of a current that flows through the reactor 302 and the current value IL10 of the current that flows through the reactor 302. The current detector 307 transmits the detected flow direction of the current (along arrow C11 or arrow C12 in FIG. 4) and the current value IL10 to the controller 308.

<Structure of Controller According to Third Embodiment>

The controller 308 can adjust (control) a voltage value (boosting) and a current value (the current value IL10 of the current that flows through the reactor 302) with respect to the load 101 of the boost chopper circuit 300 by controlling the time ratio of turning on and turning off of each of the first switching device 305a and the second switching device 305b.

The controller 308 detects the short circuit of the first diode 304a and the short circuit of the second diode 304b based on the detection result of the current detector 307 similarly to the controller 8 according to the first embodiment.

When the first diode 304a has a short-circuit fault and the voltage value Vc1 of the first capacitor 303a is higher than the voltage value Va10 of the direct-current output circuit 301, a current flows back through the first capacitor 303a, the short-circuited first diode 304a, the reactor 302, the direct-current output circuit 301, and the second switching device 305b in this order. At this time, when the second switching device 305b is turned off, a current flows through a body diode (parasitic diode) of the second switching device 305b (in the case of a MOSFET), and the second switching device 305b may degrade or fail due to heat generation. Also when the second diode 304b has a short-circuit fault, the first switching device 305a may degrade or fail similarly if the voltage value Vc2 of the second capacitor 303b is higher than the voltage value Va10 of the direct-current output circuit 301 and the first switching device 305a is turned off.

According to the third embodiment, the controller 308 performs control of turning on the second switching device 305b when the controller 308 detects the short circuit of the first diode 304a and the voltage value Vc1 of the first capacitor 303a detected by the voltage detector 306 is larger than the voltage value Va10 of the positive pole of the direct-current output circuit 301. Furthermore, the controller 308 performs control of turning on the first switching device 305a when the controller 308 detects the short circuit of the second diode 304b and the voltage value Vc2 of the second capacitor 303b detected by the voltage detector 306 is larger than the voltage value Va10 of the positive pole of the direct-current output circuit 301.

Specifically, the controller 308 performs control of switching the second switching device 305b from an off-state (disconnecting state) to an on-state (conducting state) based on the reverse of the flow direction of the current detected by the current detector 307 from a direction in which the first capacitor 303a is charged (a direction along arrow C11 in FIG. 4) to a direction in which the first capacitor 303a is discharged (a direction along arrow C12 in FIG. 4) (at the time point of reverse) when the controller 308 detects the short circuit of the first diode 304a and the voltage value Vc1 of the first capacitor 303a is larger than the voltage value Va10 of the positive pole of the direct-current output circuit 301. At this time, the controller 308 controls the first switching device 305a to be in an off-state.

Furthermore, the controller 308 performs control of switching the first switching device 305a from an off-state (disconnecting state) to an on-state (conducting state) based on the reverse of the flow direction of the current detected by the current detector 307 from a direction in which the second capacitor 303b is charged (the direction along arrow C11 in FIG. 4) to a direction in which the second capacitor 303b is discharged (the direction along arrow C12 in FIG. 4) (at the time point of reverse) when the controller 308 detects the short circuit of the second diode 304b and the voltage value Vc2 of the second capacitor 303b is larger than the voltage value Va10 of the positive pole of the direct-current output circuit 301. At this time, the controller 308 controls the second switching device 305b to be in an off-state.

Thus, the second switching device 305b conducts when a current flows back to the second switching device 305b, and hence a current can return without flowing through the body diode of the second switching device 305b, and the degradation and failure of the second switching device 305b are significantly reduced or prevented. Furthermore, the first switching device 305a conducts when a current flows back to the first switching device 305a, and hence a current can return without flowing through a body diode of the first switching device 305a, and the degradation and failure of the first switching device 305a are significantly reduced or prevented.

Even when the controller 308 detects the short circuit of the first diode 304a, no current flows back if the voltage value Vc1 of the first capacitor 303a detected by the voltage detector 306 is smaller than the voltage value Va10 of the positive pole of the direct-current output circuit 301, and hence the controller 308 performs control of turning off the second switching device 305b (and the first switching device 305a). Furthermore, even when the controller 308 detects the short circuit of the second diode 304b, no current flows back if the voltage value Vc2 of the second capacitor 303b detected by the voltage detector 306 is smaller than the voltage value Va10 of the positive pole of the direct-current output circuit 301, and hence the controller 308 performs control of turning off the first switching device 305a (and the second switching device 305b). The remaining structures of the boost chopper circuit 300 according to the third embodiment are similar to those of the step-down chopper circuit 100 according to the first embodiment.

(Operation of Boost Chopper Circuit According to Third Embodiment)

<Operation during Normal Operation>

The operation of the boost chopper circuit 300 according to the third embodiment during normal operation is now described with reference to FIG. 4. The operation of the boost chopper circuit 300 is performed by control processing of the controller 308.

When the first switching device 305a is turned on and the second switching device 305b is turned off, a current flows through the direct-current output circuit 301, the reactor 302, the first switching device 305a, the second capacitor 303b, and the second diode 304b in this order.

When the first switching device 305a is turned off and the second switching device 305b is turned on, a current flows through the direct-current output circuit 301, the reactor 302, the first diode 304a, the first capacitor 303a, and the second switching device 305b in this order.

When the first switching device 305a is turned on and the second switching device 305b is turned on, a current flows through the direct-current output circuit 301, the reactor 302, the first switching device 305a, and the second switching device 305b in this order.

When the first switching device 305a is turned off and the second switching device 305b is turned off, a current flows through the direct-current output circuit 301, the reactor 302, the first diode 304a, the first capacitor 303a, the second capacitor 303b, and the second diode 304b in this order.

In the boost chopper circuit 300, the controller 308 controls each time period (time ratio) of the above operation, and the above operation is repeated such that (converted) electric power, the voltage of which has been boosted relative to the voltage of the direct-current output circuit 301 is supplied to the load 101.

<Operation during Short Circuit Detection>

The operation of the boost chopper circuit 300 according to the third embodiment during short circuit detection is now described with reference to FIGS. 4 and 5. The operation of the boost chopper circuit 300 is performed by control processing of the controller 308.

Figure 5:
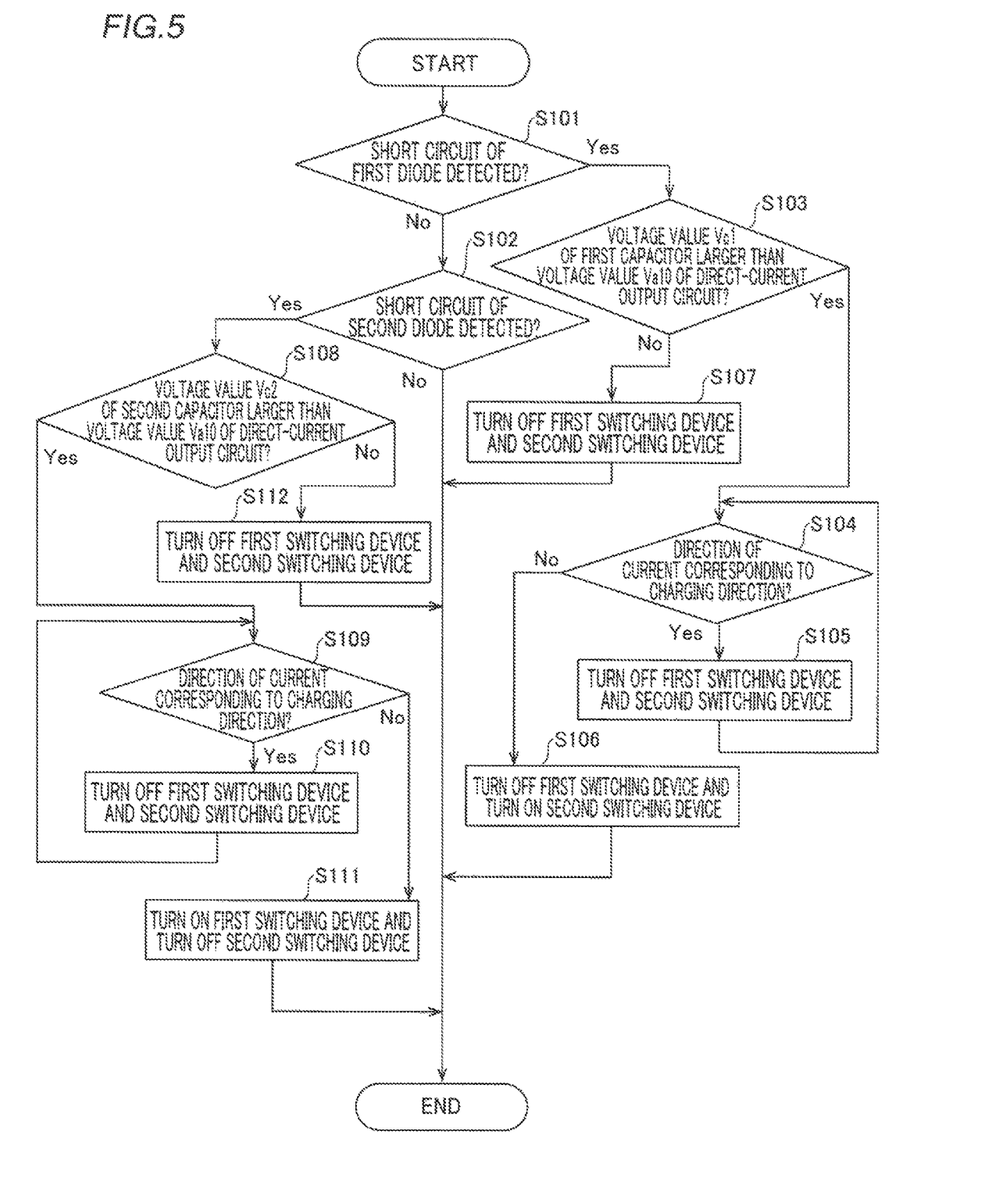
FIG. 5 is a flowchart for illustrating the control operation of the boost chopper circuit according to the third embodiment of the present invention.

As shown in FIG. 5, the controller 308 determines whether or not the short circuit of the first diode 304a has been detected at a step S101. When determining that the short circuit of the first diode 304a has not been detected, the controller 308 advances to a step S102, and when determining that the short circuit of the first diode 304a has been detected, the controller 308 advances to a step S103.

At the step S102, the controller 308 determines whether or not the short circuit of the second diode 304b has been detected. When determining that the short circuit of the second diode 304b has been detected, the controller 308 advances to a step S108, and when determining that the short circuit of the second diode 304b has not been detected, the controller 308 terminates the operation of the boost chopper circuit 300 during short circuit detection.

The above steps S101 and S102 are repeated in the above operation during normal operation such that the short circuit can be detected in the operation during normal operation.

At the step S103 to which the controller 308 advances when determining that the short circuit of the first diode 304a has been detected at the step S101, the controller 308 determines whether or not the voltage value Vc1 of the first capacitor 303a is larger than the voltage value Va10 of the positive pole of the direct-current output circuit 301. When determining that the voltage value Vc1 is larger than the voltage value Va10, the controller 308 advances to a step S104, and when determining that the voltage value Vc1 is not larger than the voltage value Va10, the controller 308 advances to a step S107.

At the step S104, the controller 308 determines whether or not the direction of the current that flows through the reactor 302 is the direction in which the first capacitor 303a is charged. More specifically, the controller 308 determines whether the direction of the current that flows through the reactor 302 is the direction in which the first capacitor 303a is charged (the direction along arrow C11 in FIG. 4) or the direction in which the first capacitor 303a is discharged (the direction along arrow C12). When determining that the direction of the current that flows through the reactor 302 is the direction in which the first capacitor 303a is charged, the controller 308 advances to a step S105, and when determining that the direction of the current that flows through the reactor 302 is not the direction in which the first capacitor 303a is charged, the controller 308 advances to a step S106.

At the step S105, both the first switching device 305a and the second switching device 305b are turned off. As shown in FIG. 4, even when the first diode 304a has a short-circuit fault, a current flows in the direction in which the first capacitor 303a is charged (through the first diode 304a, the first capacitor 303a, the second capacitor 303b, and the second diode 304b in this order) for a while, and hence a resonant circuit of the direct-current output circuit 301, the first capacitor 303a, the second capacitor 303b, and the reactor 302 is formed. In this case, when the first switching device 305a is turned on, the first capacitor 303a is short-circuited and discharged. Furthermore, a resonant circuit of the direct-current output circuit 301, the second capacitor 303b, and the reactor 302 is formed, and the second capacitor 303b is charged to a voltage higher than that during normal operation. In this case, when the second switching device 305b is turned on, a resonant circuit of the direct-current output circuit 301, the first capacitor 303a, and the reactor 302 is formed, and the first capacitor 303a is charged to a voltage higher than that during normal operation. When both the first switching device 305a and the second switching device 305b are turned on, the first capacitor 303a is short-circuited and discharged, the direct-current output circuit 301 is short-circuited through the reactor 302, and the current is increased. Thus, both the first switching device 305a and the second switching device 305b are turned off such that the safety of the entire boost chopper circuit 300 can be improved.

Then, the controller 308 returns to the step S104. More specifically, the controller 308 repeats the steps S104 and S105 until the direction of the current that flows through the reactor 302 is no longer the direction in which the first capacitor 303a is charged. At the time point when the direction of the current that flows through the reactor 302 is reversed from the direction in which the first capacitor 303a is charged to the direction in which the first capacitor 303a is discharged, the controller 308 advances to the step S106. The time point when the direction of the current that flows through the reactor 302 is reversed from the direction in which the first capacitor 303a is charged to the direction in which the first capacitor 303a is discharged is the time point when the current starts to flow back.

At the step S106, the first switching device 305a is turned off whereas the second switching device 305b is turned on. Thus, the current that flows back through the first capacitor 303a, the short-circuited first diode 304a, the reactor 302, and the direct-current output circuit 301 in this order flows through the second switching device 305b in an on-state without flowing through the body diode of the second switching device 305b. Then, the electrical discharging of the first capacitor 303a is terminated. In this period, the second capacitor 303b is prevented by the second diode 304b from being discharged. Then, the controller 308 terminates the operation of the boost chopper circuit 300 during short circuit detection.

At the step S107 to which the controller 308 advances when determining that the voltage value Vc1 is not larger than the voltage value Va10 at the step S103, both the first switching device 305a and the second switching device 305b are turned off. In this case, a current hardly flows back, and hence both the first switching device 305a and the second switching device 305b are turned off such that the operation of the boost chopper circuit 300 is stopped. Then, the controller 308 terminates the operation of the boost chopper circuit 300 during short circuit detection.

At the step S108 to which the controller 308 advances when determining that the short circuit of the second diode 304b has been detected at the step S102, the controller 308 determines whether or not the voltage value Vc2 of the second capacitor 303b is larger than the voltage value Va10 of the positive pole of the direct-current output circuit 301. When determining that the voltage value Vc2 is larger than the voltage value Va10, the controller 308 advances to a step S109, and when determining that the voltage value Vc2 is not larger than the voltage value Va10, the controller 308 advances to a step S112.

At the step S109, the controller 308 determines whether or not the direction of the current that flows through the reactor 302 is the direction in which the second capacitor 303b is charged. When determining that the direction of the current that flows through the reactor 302 is the direction in which the second capacitor 303b is charged, the controller 308 advances to a step S110, and when determining that the direction of the current that flows through the reactor 302 is not the direction in which the second capacitor 303b is charged, the controller 308 advances to a step S111.

At the step S110, both the first switching device 305a and the second switching device 305b are turned off. Then, the controller 308 returns to the step S109.

At the step S111, the first switching device 305a is turned on, and the second switching device 305b is turned off. Thus, the current that flows back through the second capacitor 303b, the first switching device 305a, the reactor 302, the direct-current output circuit 301, and the short-circuited second diode 304b in this order flows through the first switching device 305a in an on-state without flowing through the body diode of the first switching device 305a. Then, the electrical discharging of the second capacitor 303b is terminated. In this period, the first capacitor 303a is prevented by the first diode 304a from being discharged. Then, the controller 308 terminates the operation of the boost chopper circuit 300 during short circuit detection.

At the step S112 to which the controller 308 advances when determining that the voltage value Vc2 is not larger than the voltage value Va10 at the step S108, both the first switching device 305a and the second switching device 305b are turned off. Then, the controller 308 terminates the operation of the boost chopper circuit 300 during short circuit detection.

Effects of Third Embodiment

According to the third embodiment, the following effects can be obtained.

According to the third embodiment, as hereinabove described, the boost chopper circuit 300 includes the current detector 307 that detects the flow direction of the current that flows through the reactor 302. Furthermore, the controller 308 performs control of switching the second switching device 305b from an off-state to an on-state based on the reverse of the flow direction of the current detected by the current detector 307 when the controller 308 detects the short circuit of the first diode 304a and the voltage value Vc1 of the first capacitor 303a detected by the voltage detector 306 is larger than the voltage value Va10 of the positive pole of the direct-current output circuit 301. Thus, when the first diode 304a has a short-circuit fault, the second switching device 305b is turned off until the time point when a current flows back from the first capacitor 303a to the direct-current output circuit 301, whereby electrical charging from the direct-current output circuit 301 to only the first capacitor 303a can be prevented. Consequently, the electrical charging to only the first capacitor 303a is prevented, and hence the withstand breakdown of the first capacitor 303a can be prevented. Furthermore, at the time point when the first capacitor 303a starts to be discharged and a current flows back to the direct-current output circuit 301 and the second switching device 305b, the second switching device 305b is turned on, whereby the degradation and failure of the second switching device 305b can be significantly reduced or prevented.

According to the third embodiment, as hereinabove described, the controller 308 performs control of switching the second switching device 305b from an off-state to an on-state based on the reverse of the flow direction of the current detected by the current detector 307 from the direction in which the first capacitor 303a is charged (the direction along arrow C11 in FIG. 4) to the direction in which the first capacitor 303a is discharged (the direction along arrow C12 in FIG. 4) when the controller 308 detects the short circuit of the first diode 304a and the voltage value Vc1 of the first capacitor 303a detected by the voltage detector 306 is larger than the voltage value Va10 of the positive pole of the direct-current output circuit 301. Thus, even when the controller 308 detects the short circuit of the first diode 304a, electrical charging from the direct-current output circuit 301 to only the first capacitor 303a can be prevented, and the withstand breakdown of the first capacitor 303a can be prevented. Furthermore, at the time point when the first capacitor 303a starts to be discharged and a current flows back to the second switching device 305b, the second switching device 305b is turned on, whereby the degradation and failure of the second switching device 305b can be significantly reduced or prevented.

According to the third embodiment, as hereinabove described, the controller 308 performs control of turning off the second switching device 305b when the controller 308 detects the short circuit of the first diode 304a and the voltage value Vc1 of the first capacitor 303a detected by the voltage detector 306 is smaller than the voltage value Va10 of the positive pole of the direct-current output circuit 301. Thus, when the voltage value Vc1 of the first capacitor 303a is smaller than the voltage value Va10 of the positive pole of the direct-current output circuit 301, the second switching device 305b is turned off such that continued electrical charging to only the first capacitor 303a can be prevented. When the first diode 304a has a short-circuit fault, no current flows back to the second switching device 305b if the voltage value Vc1 of the first capacitor 303a is smaller than the voltage value Va10 of the positive pole of the direct-current output circuit 301, and hence the degradation and failure of the second switching device 305b can be significantly reduced or prevented even when the second switching device 305b is turned off.

According to the third embodiment, as hereinabove described, the boost chopper circuit 300 includes the first switching device 305a and the second switching device 305b connected in series to each other and connected to both ends of the direct-current output circuit 301 through the reactor 302, the first capacitor 303a connected to the first switching device 305a and connected to the first diode 304a, and the second capacitor 303b connected to the second switching device 305b and connected to the second diode 304b. Thus, the boost chopper circuit 300 capable of significantly reducing or preventing the degradation and failure of the first switching device 305a or the second switching device 305b due to the short-circuit fault of the first diode 304a or the second diode 304b can be provided. The remaining effects of the boost chopper circuit 300 according to the third embodiment are similar to those of the step-down chopper circuit 100 according to the first embodiment.

Fourth Embodiment

The structure of a boost chopper circuit 400 according to a fourth embodiment is now described with reference to FIG. 6. The boost chopper circuit 400 according to the fourth embodiment includes a first antiparallel diode 409a connected in anti-parallel to a first switching device 305a and a second antiparallel diode 409b connected in anti-parallel to a second switching device 305b in addition to the structural elements of the boost chopper circuit 300 according to the third embodiment. Portions of the boost chopper circuit 400 similar to those of the step-down chopper circuits 100 and 200 and the boost chopper circuit 300 according to the aforementioned first to third embodiments are denoted by the same reference numerals, to omit the description.

(Structure of Boost Chopper Circuit According to Fourth Embodiment)

Figure 6:
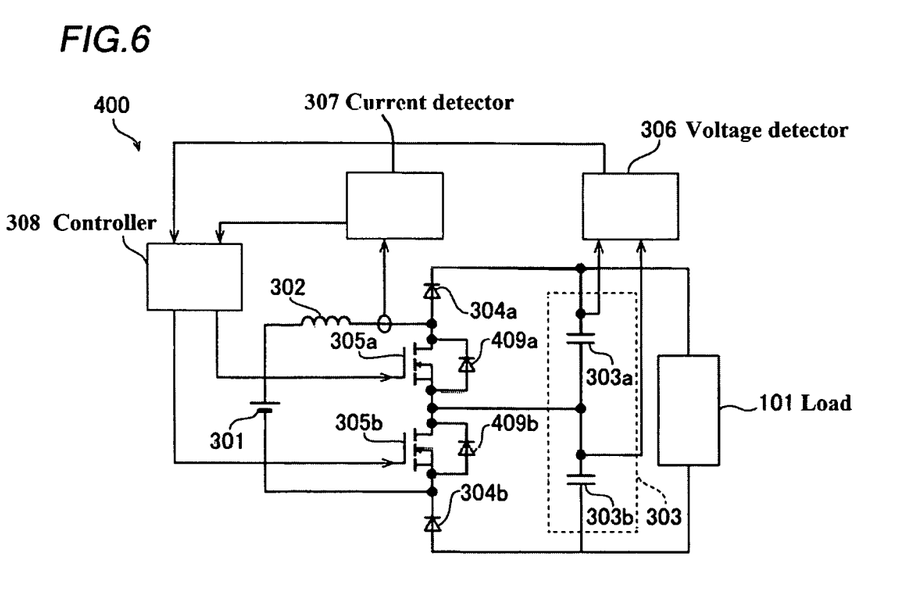
FIG. 6 is an electrical diagram showing the overall structure of a boost chopper circuit according to a fourth embodiment of the present invention.

As shown in FIG. 6, the boost chopper circuit 400 according to the fourth embodiment includes the first antiparallel diode 409a connected in anti-parallel to the first switching device 305a and the second antiparallel diode 409b connected in anti-parallel to the second switching device 305b.

The first antiparallel diode 409a and the second antiparallel diode 409b each include a silicon semiconductor (preferably a Si-PiN diode). The first antiparallel diode 409a and the second antiparallel diode 409b each can also be configured as a SiC-SBD.

Specifically, a drain or collector of the first switching device 305a and a cathode of the first antiparallel diode 409a are connected to each other. A source or emitter of the first switching device 305a and an anode of the first antiparallel diode 409a are connected to each other. A drain or collector of the second switching device 305b and a cathode of the second antiparallel diode 409b are connected to each other. A source or emitter of the second switching device 305b and an anode of the second antiparallel diode 409b are connected to each other. The remaining structures of the boost chopper circuit 400 according to the fourth embodiment are similar to those of the boost chopper circuit 300 according to the third embodiment.

(Operation of Boost Chopper Circuit According to Fourth Embodiment during Short Circuit)

The operation of the boost chopper circuit 400 according to the fourth embodiment during short circuit is now described with reference to FIG. 6. The control operation of the boost chopper circuit 400 is performed by control processing of a controller 308.

When a first diode 304a has a short-circuit fault and a current starts to flow back from a first capacitor 303a (electrical discharging starts), the second switching device 305b is turned on. The current that flows back flows from the first capacitor 303a through the short-circuited first diode 304a, a reactor 302, a direct-current output circuit 301, the second switching device 305b, and the second antiparallel diode 409b. In this case, a current hardly flows through a body diode of the second switching device 305b, and a leakage current also hardly flows.

When a second diode 304b has a short-circuit fault and a current starts to flow back from a second capacitor 303b (electrical discharging starts), the first switching device 305a is turned on. Then, the current that flows back flows to the first switching device 305a and the first antiparallel diode 409a. In this case, a current hardly flows through a body diode of the first switching device 305a, and a leakage current also hardly flows. The operation (see FIG. 5) of the boost chopper circuit 400 according to the fourth embodiment during normal operation and during short circuit detection is similar to that of the boost chopper circuit 300 according to the third embodiment.

Effects of Fourth Embodiment

According to the fourth embodiment, the following effects can be obtained.

According to the fourth embodiment, as hereinabove described, the boost chopper circuit 400 includes the first antiparallel diode 409a connected in anti-parallel to the first switching device 305a and the second antiparallel diode 409b connected in anti-parallel to the second switching device 305b. Thus, when a current flows back to the first switching device 305a, the current that flows back also flows to the first antiparallel diode 409a, and hence the amount of current that flows back to the first switching device 305a can be reduced. When a current flows back to the second switching device 305b, the current that flows back also flows to the second antiparallel diode 409b, and hence the amount of current that flows back to the second switching device 305b can be reduced. Consequently, the degradation and failure of the first switching device 305a and the second switching device 305b can be more reliably significantly reduced or prevented. The remaining effects of the boost chopper circuit 400 according to the fourth embodiment are similar to those of the boost chopper circuit 300 according to the third embodiment.

Modification

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the current detector and the controller detect the short circuit of the first diode and the short circuit of the second diode in each of the aforementioned first to fourth embodiments, the present invention is not restricted to this. More specifically, according to the present invention, in the step-down chopper circuit or the boost chopper circuit, a dedicated circuit for short circuit detection may alternatively be provided separately from the current detector and the controller.

For example, the short circuits may be detected by a detector that detects a voltage between both terminals of the first diode and a voltage between both terminals of the second diode. Thus, the short circuits of the first diode and the second diode can be detected together with the forward voltages or reverse voltages of the first diode and the second diode by associating the voltages between both the terminals with the operating states of the first switching device and the second switching device.

While the first switching device, the second switching device, the first diode, and the second diode each include the wide band gap semiconductor in each of the aforementioned first to fourth embodiments, the present invention is not restricted to this. More specifically, according to the present invention, the first switching device, the second switching device, the first diode, and the second diode each may alternatively include a silicon semiconductor, for example.

While the control operation of the step-down chopper circuit according to the aforementioned first embodiment and the control operation of the boost chopper circuit according to the aforementioned third embodiment are described, using the flowcharts described in a flow-driven manner in which processing is performed in order along a processing flow, the present invention is not restricted to this. According to the present invention, the control processing operation may alternatively be performed in an event-driven manner in which processing is performed on an event basis. In this case, the control processing operation may be performed in a complete event-driven manner or in a combination of an event-driven manner and a flow-driven manner.

What is claimed is:

1. A chopper circuit comprising:
   a reactor;
   a direct-current output circuit;
   a capacitor circuit connected to a load;
   a first diode and a second diode each connected to the capacitor circuit;
   a first switching device connected in series to the first diode;
   a second switching device connected in series to the second diode;
   a short circuit detector that detects a short circuit of the first diode and a short circuit of the second diode; and
   a controller that performs control of turning on the second switching device when the short circuit detector detects the short circuit of the first diode, and performs control of turning on the first switching device when the short circuit detector detects the short circuit of the second diode.

2. The chopper circuit according to claim 1, further comprising a voltage detector that detects a voltage value of the capacitor circuit, wherein
   the controller performs control of turning on the second switching device when the short circuit detector detects the short circuit of the first diode and the voltage value of the capacitor circuit detected by the voltage detector is larger than a voltage value of a positive pole of the direct-current output circuit, and performs control of turning on the first switching device when the short circuit detector detects the short circuit of the second diode and the voltage value of the capacitor circuit detected by the voltage detector is larger than the voltage value of the positive pole of the direct-current output circuit.

3. The chopper circuit according to claim 2, further comprising a current direction detector that detects a flow direction of a current that flows through the reactor, wherein
   the controller performs control of switching the second switching device from an off-state to an on-state based on reverse of the flow direction of the current detected by the current direction detector when the short circuit detector detects the short circuit of the first diode and the voltage value of the capacitor circuit detected by the voltage detector is larger than the voltage value of the positive pole of the direct-current output circuit.

4. The chopper circuit according to claim 3, wherein
   the controller performs control of switching the second switching device from the off-state to the on-state based on the reverse of the flow direction of the current detected by the current direction detector from a direction in which a capacitor of the capacitor circuit is charged to a direction in which the capacitor of the capacitor circuit is discharged when the short circuit detector detects the short circuit of the first diode and the voltage value of the capacitor circuit detected by the voltage detector is larger than the voltage value of the positive pole of the direct-current output circuit.

5. The chopper circuit according to claim 2, wherein the controller performs control of turning off the second switching device when the short circuit detector detects the short circuit of the first diode and the voltage value of the capacitor circuit detected by the voltage detector is smaller than the voltage value of the positive pole of the direct-current output circuit.

6. The chopper circuit according to claim 1, further comprising a first antiparallel diode connected in anti-parallel to the first switching device and a second antiparallel diode connected in anti-parallel to the second switching device.

7. The chopper circuit according to claim 1, wherein the first switching device and the second switching device each include a wide band gap semiconductor.

8. The chopper circuit according to claim 1, wherein the chopper circuit is a step-down chopper circuit, the capacitor circuit includes a capacitor for a step-down chopper connected in series to the reactor, the first diode and the second diode are connected to both ends of the capacitor for the step-down chopper through the reactor, and are connected in series to each other, and the direct-current output circuit includes a first output circuit, a positive pole of which is connected to the first switching device and a negative pole of which is connected to an anode of the first diode, and a second output circuit, a positive pole of which is connected to the negative pole of the first output circuit and a cathode of the second diode and a negative pole of which is connected to the second switching device.

9. The chopper circuit according to claim 1, wherein the chopper circuit is a boost chopper circuit, the first switching device and the second switching device are connected to both ends of the direct-current output circuit through the reactor, and are connected in series to each other, and the capacitor circuit includes a first capacitor for a boost chopper connected to the first switching device and connected to the first diode, and a second capacitor for the boost chopper connected to the second switching device and connected to the second diode.

\* \* \* \* \*